(12) United States Patent
Takada et al.

(10) Patent No.: US 10,023,123 B2
(45) Date of Patent: Jul. 17, 2018

(54) IMAGE DISPLAY MIRROR FOR A VEHICLE

(71) Applicant: NITTO DENKO CORPORATION, Ibaraki-shi, Osaka (JP)

(72) Inventors: Katsunori Takada, Ibaraki (JP); Tadayuki Kameyama, Ibaraki (JP); Yoshitsugu Kitamura, Ibaraki (JP); Keisuke Kimura, Ibaraki (JP); Hiroki Kuramoto, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 14/994,672

(22) Filed: Jan. 13, 2016

(65) Prior Publication Data

US 2016/0200255 A1 Jul. 14, 2016

(30) Foreign Application Priority Data

Jan. 14, 2015 (JP) ................................. 2015-005099
Dec. 4, 2015 (JP) ................................. 2015-237058

(51) Int. Cl.
*B60R 1/08* (2006.01)
*G02B 5/08* (2006.01)
(Continued)

(52) U.S. Cl.
CPC .............. *B60R 1/084* (2013.01); *B60R 1/083* (2013.01); *B60R 1/088* (2013.01); *B60R 1/12* (2013.01);
(Continued)

(58) Field of Classification Search
CPC .......... B60R 1/083; B60R 1/084; B60R 1/085; B60R 1/086; B60R 1/087; B60R 1/088;
(Continued)

(56) References Cited

U.S. PATENT DOCUMENTS 7,679,809 B2    3/2010   Tonar et al.
2003/0012936 A1  1/2003   Draheim et al.
(Continued)

FOREIGN PATENT DOCUMENTS

JP          5273286 B1    8/2013

OTHER PUBLICATIONS

Extended European Search Report dated Jun. 13, 2016, issued in counterpart European Patent Application No. 16151039.1. (8 pages).

*Primary Examiner* — Marin Pichler
(74) *Attorney, Agent, or Firm* — Westerman, Hattori, Daniels & Adrian, LLP

(57) ABSTRACT

Provided is an image display mirror that includes a half mirror and an image display apparatus, reduces an influence of a reflected image provided by the half mirror, and is excellent in visibility of an image displayed on the image display apparatus. The image display mirror for a vehicle includes: a circularly polarizing plate arranged attachably and removably; a half mirror; and an image display apparatus in the stated order from a viewer side. In one embodiment, attached and removed states of the circularly polarizing plate are switched when an image is displayed on the image display apparatus and when the image is not displayed thereon, and when the image is displayed, the circularly polarizing plate is arranged between the half mirror and a viewer.

10 Claims, 3 Drawing Sheets

(51) Int. Cl.
  *G02B 5/30* (2006.01)
  *B60R 1/12* (2006.01)

(52) U.S. Cl.
  CPC ........ *B60R 2001/1215* (2013.01); *G02B 5/08* (2013.01); *G02B 5/30* (2013.01)

(58) Field of Classification Search
  CPC . B60R 1/12; B60R 1/1207; B60R 2001/1215; B60R 2001/1246; B60R 2001/1253; G02B 5/08; G02B 5/30; G02B 5/3025; G02B 5/3083
  USPC .............................. 359/488.1, 601–609, 229
  See application file for complete search history.

(56) References Cited

U.S. PATENT DOCUMENTS

| | | |
|---|---|---|
| 2006/0209239 A1 | 9/2006 | Lin |
| 2009/0002822 A1* | 1/2009 | Tonar ..................... B60R 1/088 359/488.01 |
| 2010/0277786 A1 | 11/2010 | Anderson et al. |
| 2011/0222155 A1 | 9/2011 | Sakai et al. |
| 2014/0347488 A1 | 11/2014 | Tazaki et al. |

* cited by examiner

IMAGE DISPLAY MIRROR FOR A VEHICLE

This application claims priority under 35 U.S.C. Section 119 to Japanese Patent Application No. 2015-005099 filed on Jan. 14, 2015 and No. 2015-237058 filed on Dec. 4, 2015, which are herein incorporated by references.

BACKGROUND OF THE INVENTION

1. Field of the Invention

The present invention relates to an image display mirror for a vehicle.

2. Description of the Related Art

A technology involving combining a rear-view mirror for a vehicle with an image display apparatus to display an image has heretofore been known. For example, Japanese Patent No. 5273286 discloses an image display mirror including a half mirror arranged on the front surface (viewer side surface) of a monitor. In the image display mirror, the rear can be viewed with a reflected image provided by the half mirror. Meanwhile, when an image is displayed on the monitor, the image can be viewed through the half mirror.

Such image display mirror involves a problem in that, for example, when the quantity of light from the rear of a vehicle is large, the reflected image inhibits the visibility of an image displayed on the monitor. Japanese Patent No. 5273286 proposes the following technology. An influence of the reflected image is reduced by making the angle of the half mirror when a viewer (occupant) views the rear and the angle when the viewer views the image of the monitor different from each other. According to such technology, the influence of the reflected image provided by the half mirror can be reduced by adjusting the angle of the half mirror so that when the monitor image is viewed, the reflected image becomes an image that does not inhibit the visibility of the monitor image, specifically so that a ceiling is mirrored by reflection.

However, when it is difficult to turn the reflected image provided by the half mirror into the image that does not inhibit the visibility of the monitor image, e.g., when the image display mirror of Japanese Patent No. 5273286 is applied to a vehicle including a ceiling that transmits light, such as a panoramic roof or a sunroof, or a convertible car, the influence of the reflected image cannot be reduced by the mirror.

SUMMARY OF THE INVENTION

The present invention has been made to solve the conventional problems, and an object of the present invention is to provide an image display mirror that includes a half mirror and an image display apparatus, reduces an influence of a reflected image provided by the half mirror, and is excellent in visibility of an image displayed on the image display apparatus.

An image display mirror for a vehicle according to one embodiment of the present invention includes: a circularly polarizing plate arranged attachably and removably; a half mirror; and an image display apparatus in the stated order from a viewer side.

In one embodiment of the present invention, attached and removed states of the circularly polarizing plate are switched when an image is displayed on the image display apparatus and when the image is not displayed thereon, and when the image is displayed, the circularly polarizing plate is arranged between the half mirror and a viewer.

In one embodiment of the present invention, the circularly polarizing plate includes a first linear polarizer and a first $\lambda/4$ plate, and the first linear polarizer is arranged to be closer to the viewer side than the first $\lambda/4$ plate is.

In one embodiment of the present invention, the circularly polarizing plate is subjected to an antiglare treatment.

In one embodiment of the present invention, the circularly polarizing plate is subjected to a low-reflection treatment.

In one embodiment of the present invention, the circularly polarizing plate is subjected to an antiglare treatment and a low-reflection treatment.

In one embodiment of the present invention, the image display mirror for a vehicle is configured so that light to be transmitted through the half mirror from a back surface side becomes circularly polarized light.

In one embodiment of the present invention, the image display mirror for a vehicle further includes a $\lambda/4$ plate on a viewer side of the circularly polarizing plate.

In one embodiment of the present invention, the half mirror and the image display apparatus are brought into close contact with each other by interlayer filling.

According to another embodiment of the present invention, there is provided a method of observing surroundings of a vehicle. The method of observing surroundings of a vehicle is a method by which a driver of a vehicle observes surroundings of the vehicle with the above-mentioned image display mirror for a vehicle, the method including: switching attached and removed states of the circularly polarizing plate when an image is displayed on the image display apparatus and when the image is not displayed thereon; and arranging, when the image is displayed, the circularly polarizing plate between the half mirror and the driver of the vehicle.

The image display mirror for a vehicle according to the embodiment of the present invention includes the circularly polarizing plate arranged attachably and removably, the half mirror, and the image display apparatus in the stated order from the viewer side. In such image display mirror for a vehicle, when an image is displayed on the image display apparatus, the image can be viewed through the circularly polarizing plate. As a result, an influence of a reflected image provided by the half mirror is reduced and hence the visibility of the image displayed on the image display apparatus improves. In addition, when the image is not displayed on the image display apparatus, the reflected image can be viewed without through the circularly polarizing plate, and hence the half mirror can express a function as a mirror.

DETAILED DESCRIPTION OF THE PREFERRED EMBODIMENTS

Embodiments of the present invention are hereinafter described with reference to the drawings. However, the present invention is not limited to these embodiments.

A. Overall Configuration of Image Display Mirror for Vehicle

Figure 1:
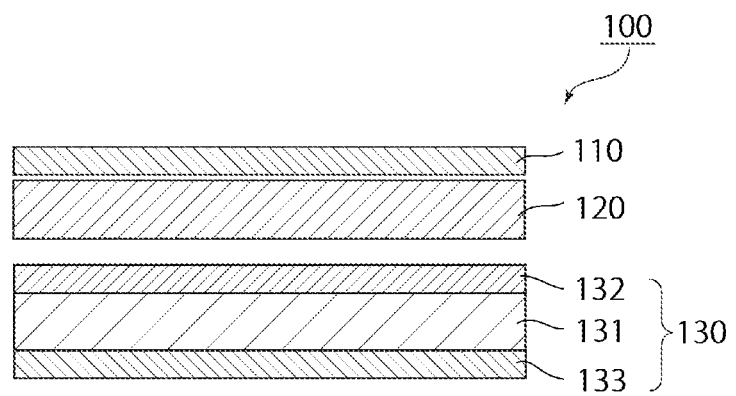
FIG. 1 is a schematic sectional view of an image display mirror according to one embodiment of the present invention.

FIG. 1 is a schematic sectional view of an image display mirror according to one embodiment of the present invention. An image display mirror 100 for a vehicle includes a circularly polarizing plate 110 arranged attachably and removably, a half mirror 120, and an image display apparatus 130 in the stated order from a viewer side. The half mirror 120 and the image display apparatus 130 are preferably arranged so as to be parallel to each other. The image display mirror for a vehicle of this embodiment can be used as, for example, the rear-view mirror (room mirror) of a vehicle. The half mirror 120 has a light-reflecting function and a light-transmitting function. The image display mirror 100 for a vehicle enables an occupant (more specifically, a driver) of the vehicle to observe the surroundings (e.g., the rear) of the vehicle by virtue of the light-reflecting function of the half mirror 120. In addition, in the image display mirror 100 for a vehicle, an image displayed on the image display apparatus 130 can be viewed by virtue of the light-transmitting function of the half mirror 120. The image display apparatus 130 displays, for example, an image provided by an external camera that mirrors the surroundings (e.g., the rear) of the vehicle. With such configuration, even, for example, when an obstacle (such as a passenger or baggage) is present in the vehicle and hence the surroundings of the vehicle cannot be sufficiently observed with the reflected image of the half mirror, the safety of the vehicle can be secured by displaying the image provided by the external camera on the image display apparatus. It should be noted that, although not illustrated, the image display mirror for a vehicle of the present invention may further include any appropriate other member.

As described above, the circularly polarizing plate is arranged attachably and removably. The phrase "arranged attachably and removably" as used herein means that the circularly polarizing plate is arranged so that a state in which the occupant (more specifically, the driver) of the vehicle serving as a viewer observes the half mirror through the circularly polarizing plate (also referred to as "attached state") and a state in which the occupant observes the half mirror without through the circularly polarizing plate (also referred to as "removed state") can be switched. It should be noted that even when the circularly polarizing plate is physically distant from the half mirror, the state in which the driver of the vehicle observes the half mirror through the circularly polarizing plate is the attached state of the circularly polarizing plate. It is preferred that the attached and removed states of the circularly polarizing plate be switched when the image is displayed on the image display apparatus and when the image is not displayed thereon, and when the image is displayed, the circularly polarizing plate be arranged between the half mirror and the viewer. In the present invention, the circularly polarizing plate is arranged attachably and removably, and hence when the image is displayed on the image display apparatus, the image can be viewed through the circularly polarizing plate. As a result, an influence of the reflected image provided by the half mirror is reduced and hence the visibility of the image displayed on the image display apparatus improves. In addition, when the image is not displayed on the image display apparatus, the reflected image can be viewed without through the circularly polarizing plate, and hence the half mirror can express a function as a mirror.

Figure 2A:
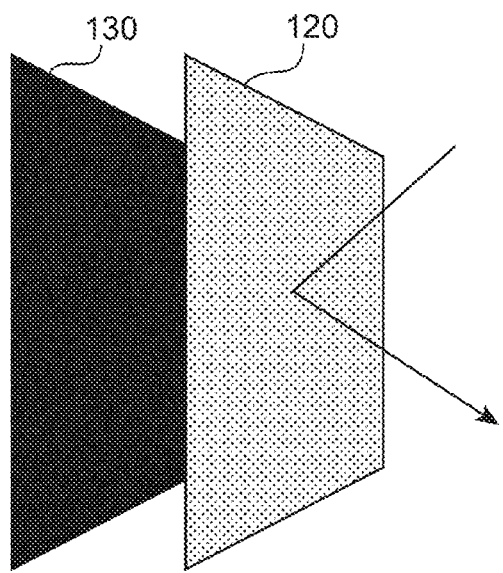
FIG. 2A and FIG. 2B are each a schematic view for illustrating an action according to the one embodiment of the present invention.
Figure 2B:
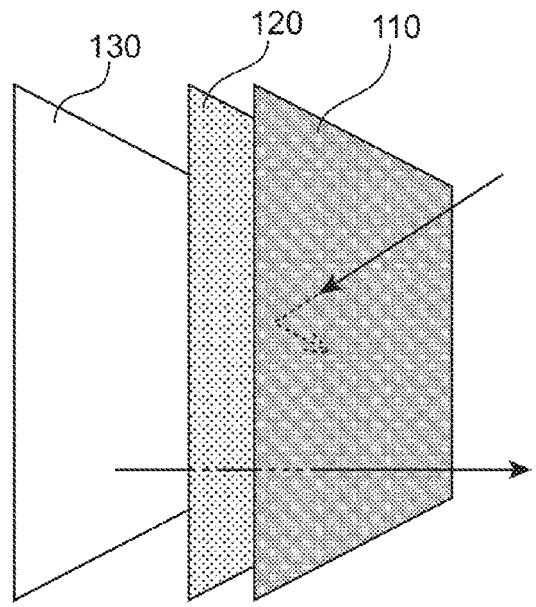

FIG. 2A and FIG. 2B are each a schematic view for illustrating an action according to the one embodiment of the present invention. FIG. 2A is an illustration of a state in which the reflected image provided by the half mirror 120 is subjected to viewing, i.e., the removed state of the circularly polarizing plate. In this state, the image is not displayed on the image display apparatus 130, and hence the quantity of light entering from its back surface to be transmitted through the half mirror is substantially zero. Accordingly, the occupant of the vehicle can view the reflected image provided by the half mirror. FIG. 2B is an illustration of a state in which the image is displayed on the image display apparatus 130, i.e., the attached state of the circularly polarizing plate 110. In this state, (i) light entering from the viewer side of the circularly polarizing plate 110 is transmitted through the circularly polarizing plate 110 to become right- or left-handed circularly polarized light, (ii) the circularly polarized light is reflected by the half mirror to become circularly polarized light opposite-handed to that at the time of the entry, and (iii) the opposite-handed circularly polarized light is absorbed by the circularly polarizing plate 110 and hence the reflected image provided by the half mirror becomes difficult to view. On the other hand, light from the image display apparatus transmitted through the half mirror can be transmitted through the circularly polarizing plate, and hence the image displayed on the image display apparatus is subjected to the viewing. As described above, according to the image display mirror for a vehicle of the present invention, the influence of the reflected image provided by the half mirror is reduced and hence the visibility of the image displayed on the image display apparatus 130 can be improved.

Any appropriate mechanism can be adopted as a mechanism for attaching and removing the circularly polarizing plate as long as the effects of the present invention are obtained. For example, such a mechanism that the image display mirror for a vehicle is accommodated in a housing, and the circularly polarizing plate is manually or electrically attached and removed in the housing is permitted, such a mechanism that the circularly polarizing plate is hung on the viewer side of the half mirror to be brought into the attached state is permitted, or such a mechanism that the circularly polarizing plate is caused to escape toward a side surface of the image display mirror for a vehicle to be brought into the removed state is permitted.

The half mirror and the image display apparatus (or the half mirror or the image display apparatus and the other member) may be brought into contact with each other or may be out of contact with each other. It is preferred that a gap between the half mirror and the image display apparatus (or the half mirror or the image display apparatus and the other member) be filled with a transparent resin, and both the members be brought into close contact with each other. When both the members are brought into close contact with each other as described above, an image display mirror for a vehicle excellent in efficiency with which light is utilized and excellent in visibility of a displayed image can be obtained. Any appropriate resin film, pressure-sensitive adhesive, or the like can be used in interlayer filling. A pressure-sensitive adhesive excellent in transparency is preferably used as the pressure-sensitive adhesive. Examples thereof include an acrylic pressure-sensitive adhesive, a silicone-based pressure-sensitive adhesive, and a rubber-based pressure-sensitive adhesive.

B. Circularly Polarizing Plate

A laminate of a first linear polarizer (absorption-type polarizer) and a first $\lambda/4$ plate can be used as the circularly polarizing plate. The $\lambda/4$ plate has a function of transforming linearly polarized light into circularly polarized light (or circularly polarized light into linearly polarized light) when being laminated so that the absorption axis of the linear polarizer and the slow axis of the λ/4 plate form an angle of about ±45°. A front retardation $R_0$ of the λ/4 plate at a wavelength of 590 nm is from 90 nm to 190 nm, preferably from 100 nm to 180 nm, more preferably from 110 nm to 170 nm. It should be noted that the front retardation $R_0$ is herein determined from the equation "$R_0=(nx-ny)\times d$" where nx represents a refractive index in the direction in which an in-plane refractive index becomes maximum (i.e., a slow axis direction), ny represents a refractive index in a direction perpendicular to the slow axis in a plane (i.e., a fast axis direction), and d (nm) represents the thickness of a retardation film, the parameters being values under a temperature of 23° C. The λ/4 plate shows any appropriate refractive index ellipsoid as long as the plate has the relationship of nx>ny. For example, the refractive index ellipsoid of the λ/4 plate shows the relationship of nx>nz>ny or nx>ny≥nz.

The angle formed between the absorption axis of the first linear polarizer and the slow axis of the first λ/4 plate is preferably from +40° to +50° or from −40° to −50°, more preferably from +43° to +47° or from −43° to −47°, still more preferably +45° or −45°.

The circularly polarizing plate is preferably arranged so that the first linear polarizer is closer to the viewer side than the first λ/4 plate is. In other words, when the circularly polarizing plate is in the attached state, the first linear polarizer, the first λ/4 plate, and the half mirror are preferably arranged in the stated order from the viewer side. The first linear polarizer turns incident light into linearly polarized light. In addition, the first linear polarizer absorbs reflected light. More specifically, light that has been reflected by the half mirror to become opposite-handed circularly polarized light, and has been transmitted through the first λ/4 plate is absorbed by the first linear polarizer.

The thickness of the circularly polarizing plate is preferably 200 μm or less, more preferably from 10 μm to 180 μm, still more preferably from 10 μm to 160 μm.

Any appropriate material can be used as a material for constituting the first λ/4 plate as long as the effects of the present invention are obtained. A typical example thereof is a stretched film of a polymer film. As a resin for forming the polymer film, there are given, for example, a polycarbonate-based resin and a cycloolefin-based resin.

The first λ/4 plate can be formed by stretching the polymer film. The front retardation and thickness direction retardation of the first λ/4 plate can be controlled by adjusting the stretching ratio and stretching temperature of the polymer film.

The stretching ratio can be appropriately changed in accordance with, for example, a front retardation and a thickness direction retardation which the first λ/4 plate is desired to have, a thickness which the first λ/4 plate is desired to have, the kind of the resin to be used, the thickness of the polymer film to be used, and the stretching temperature. Specifically, the stretching ratio is preferably from 1.1 times to 2.5 times, more preferably from 1.25 times to 2.45 times, still more preferably from 1.4 times to 2.4 times.

The stretching temperature can be appropriately changed in accordance with, for example, a front retardation and a thickness direction retardation which the first λ/4 plate is desired to have, a thickness which the first λ/4 plate is desired to have, the kind of the resin to be used, the thickness of the polymer film to be used, and the stretching ratio. Specifically, the stretching temperature is preferably from 100° C. to 250° C., more preferably from 105° C. to 240° C., still more preferably from 110° C. to 240° C.

Any appropriate method is adopted as a stretching method as long as such optical characteristics and thickness as described above are obtained. Specific examples thereof include free-end stretching and fixed-end stretching. Of those, free-end uniaxial stretching is preferably used and free-end longitudinal uniaxial stretching is more preferably used.

The total light transmittance of the first λ/4 plate is preferably 80% or more, more preferably 85% or more, still more preferably 90% or more.

The transmittance (also referred to as "single axis transmittance") of the first linear polarizer at a wavelength of 589 nm is preferably 41% or more, more preferably 42% or more. It should be noted that a theoretical upper limit for the single axis transmittance is 50%. In addition, its polarization degree is preferably from 99.5% to 100%, more preferably from 99.9% to 100%.

Any appropriate polarizer may be used as the first linear polarizer. Examples thereof include: a polarizer obtained by adsorbing a dichroic substance, such as iodine or a dichroic dye, onto a hydrophilic polymer film, such as a polyvinyl alcohol-based film, a partially formalized polyvinyl alcohol-based film, or an ethylene-vinyl acetate copolymer-based partially saponified film, and subjecting the resultant film to uniaxial stretching; and polyene-based alignment films, such as a dehydrated product of polyvinyl alcohol and a dehydrochlorinated product of polyvinyl chloride. Of those, a polarizer obtained by adsorbing a dichroic substance, such as iodine, onto a polyvinyl alcohol-based film and subjecting the resultant film to uniaxial stretching is particularly preferred because of its high polarized dichromaticity. The first linear polarizer has a thickness of preferably from 0.5 μm to 80 μm.

The polarizer obtained by adsorbing iodine onto a polyvinyl alcohol-based film and subjecting the resultant film to uniaxial stretching is typically produced by dyeing polyvinyl alcohol through immersion in an aqueous solution of iodine and stretching the resultant film at a ratio of from 3 times to 7 times with respect to its original length. The stretching may be carried out after the dyeing, the stretching may be carried out during the dyeing, or the stretching may be carried out before the dyeing. The polarizer may be produced by subjecting the film to treatments such as swelling, cross-linking, adjusting, washing with water, and drying in addition to the stretching and the dyeing.

In one embodiment, a circularly polarizing plate subjected to an antiglare treatment (antiglare circularly polarizing plate) is used as the circularly polarizing plate. It is preferred that the surface of the circularly polarizing plate on a first linear polarizer side be subjected to the antiglare treatment. Examples of the antiglare treatment include a particle-based antiglare treatment involving forming surface unevenness and a transfer-based antiglare treatment involving transferring a shape through embossing or the like. An antiglare-treated layer can be formed by, for example, mixing a binder resin and particles, and applying, drying, and curing the mixture.

In one embodiment, a circularly polarizing plate subjected to a low-reflection treatment (low-reflection-treated circularly polarizing plate) is used as the circularly polarizing plate. It is preferred that the surface of the circularly polarizing plate on the first linear polarizer side be subjected to the low-reflection treatment. The low-reflection treatment is, for example, a treatment involving forming a layer, such as a fluorine-based resin layer, a multilayer metal-deposited layer, or an optical interference layer.

A circularly polarizing plate subjected to the antiglare treatment and the low-reflection treatment (antiglare and low-reflection circularly polarizing plate) is preferably used as the circularly polarizing plate. The use of such circularly polarizing plate can effectively prevent glare and reflection on the surface of the circularly polarizing plate. In one embodiment, an antiglare and low-reflection circularly polarizing plate having the circularly polarizing plate subjected to the low-reflection treatment on the circularly polarizing plate subjected to the antiglare treatment (antiglare circularly polarizing plate), i.e., having the antiglare-treated layer and a low-reflection-treated layer in the stated order from the circularly polarizing plate (preferably the first linear polarizer) is used.

Figure 3:
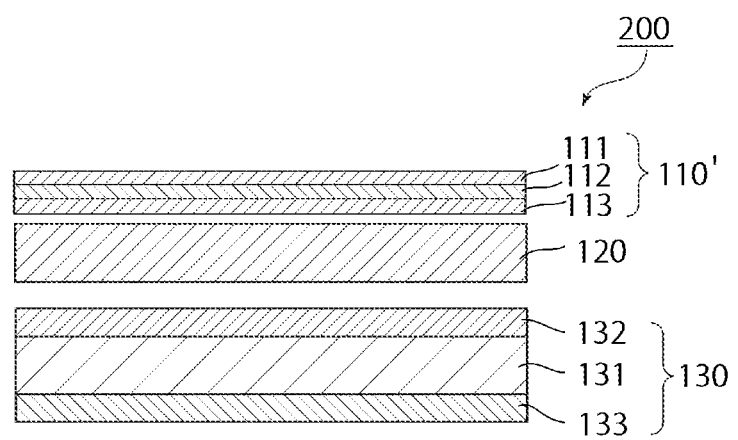
FIG. 3 is a schematic sectional view of an image display mirror according to another embodiment of the present invention.

In one embodiment, a circularly polarizing plate further including a retardation layer is used as the circularly polarizing plate. FIG. 3 is a schematic sectional view of an image display mirror for illustrating an example of this embodiment. A circularly polarizing plate 110' to be used in an image display mirror 200 further includes a λ/2 plate 112 as the retardation layer, and includes a first linear polarizer 111, the λ/2 plate 112, and a first λ/4 plate 113 in the stated order from a viewer side to a half mirror side. The λ/2 plate preferably has a refractive index ellipsoid of nx>ny≥nz. The circularly polarizing plate in this embodiment expresses an excellent antireflection effect and an excellent antiglare effect. The use of such circularly polarizing plate can widen a wavelength range in which the effects of the invention of the present application are obtained (i.e., secure the effects at longer or shorter wavelengths).

A front retardation $R_0$ of the λ/2 plate at a wavelength of 590 nm is preferably from 190 nm to 360 nm, more preferably from 220 nm to 330 nm.

An angle formed between the slow axis of the λ/2 plate and the absorption axis of the first linear polarizer may be set to any appropriate angle as long as the effects of the present invention are obtained. It is preferred that the angle formed between the slow axis of the λ/2 plate and the absorption axis of the first linear polarizer be not a multiple of π/4. That is, it is preferred that the angle be not 0°±5°, 90°±5°, 180°±5°, and 270°±5°.

A relationship between the slow axis of the λ/2 plate and the slow axis of the first λ/4 plate is preferably adjusted so that an angle formed between the polarization direction of polarized light after its passage through the λ/2 plate and the slow axis of the first λ/4 plate becomes appropriate. Specifically, when the slow axis of the λ/2 plate is positioned on a clockwise side (from 0° to +180°) with respect to the absorption axis of the first polarizer, the axial angle of the slow axis of the first λ/4 plate is preferably from +40° to +50°, more preferably from +43° to +47°, still more preferably +45° with respect to the polarization direction after the passage through the λ/2 plate. In addition, when the slow axis of the λ/2 plate is positioned on a counterclockwise side (from −180° to 0°) with respect to the absorption axis of the first polarizer, the axial angle of the slow axis of the first λ/4 plate is preferably from −40° to −50°, more preferably from −43° to −47°, still more preferably −45° with respect to the polarization direction after the passage through the λ/2 plate. Herein, the expression "+x°" means that the angle is x° in a clockwise direction with respect to a direction serving as a reference (e.g., the polarization direction after the passage through the λ/2 plate), and the expression "−x°" means that the angle is x° in a counterclockwise direction with respect to the direction serving as the reference (e.g., the polarization direction after the passage through the λ/2 plate).

The λ/2 plate is preferably a stretched film of a polymer film like the λ/4 plate.

C. Half Mirror

Any appropriate mirror can be used as the half mirror as long as the mirror can transmit part of incident light and reflect other part thereof. Examples thereof include: a half mirror including a transparent base material and a metal thin film formed on the transparent base material; and a half mirror including a transparent base material and a dielectric multilayer film formed on the transparent base material. The half mirror is preferably free of a polarization function from the viewpoint that the effect of arranging the circularly polarizing plate is efficiently obtained.

Any appropriate material can be used as a material for constituting the transparent base material. Examples of the material include: transparent resin materials, such as polymethyl methacrylate, polycarbonate, and an epoxy resin; and glass. The thickness of the transparent base material is, for example, from 20 μm to 5,000 μm. The transparent base material is preferably free of a retardation.

A metal having a highlight reflectance can be used as a material for constituting the metal thin film, and examples thereof include aluminum, silver, and tin. The metal thin film can be formed by, for example, plating or vapor deposition. The thickness of the metal thin film is, for example, from 2 nm to 80 nm, preferably from 3 nm to 50 nm.

In the dielectric multilayer film, a high-refractive index material and a low-refractive index material each having a predetermined thickness are laminated so that the film has a function as a mirror. The high-refractive index material and the low-refractive index material are preferably laminated in an alternate manner, and the function as the half mirror is expressed by utilizing the interference of light beams occurring upon their incidence from the low-refractive index material to the high-refractive index material. The half mirror including the dielectric multilayer film is preferred because its absorption of light is reduced.

The high-refractive index material has a refractive index of preferably more than 2.0, more preferably more than 2.0 and 3.0 or less. Specific examples of the high-refractive index material include $ZnS-SiO_2$, $TiO_2$, $ZrO_2$, and $Ta_2O_3$. The low-refractive index material has a refractive index of preferably from 1.2 to 2.0, more preferably from 1.4 to 1.9. Specific examples of the low-refractive index material include $SiO_2$, $Al_2O_3$, and $MgF$.

The visible light reflectance of the half mirror is preferably from 20% to 80%, more preferably from 30% to 70%, still more preferably from 40% to 60%. In addition, the visible light transmittance of the half mirror is preferably from 20% to 80%, more preferably from 30% to 70%, still more preferably from 40% to 60%. The visible light reflectance, the visible light transmittance, and a ratio therebetween (described later) can be adjusted by controlling the thickness of the metal thin film or the dielectric multilayer film.

The ratio between the visible light reflectance and visible light transmittance of the half mirror (reflectance:transmittance) is preferably from 2:8 to 8:2, more preferably from 3:7 to 7:3, still more preferably from 4:6 to 6:4. The ratio between the visible light reflectance and the visible light transmittance can be appropriately adjusted in accordance with, for example, the brightness of the image display apparatus.

D. Image Display Apparatus

Any appropriate apparatus can be used as the image display apparatus. Examples thereof include a liquid crystal display apparatus, an organic EL display apparatus, and a plasma display apparatus. Description is given below by taking the liquid crystal display apparatus as a typical example. In one embodiment, as the liquid crystal display apparatus, there is used an image display apparatus including, as illustrated in FIG. 1, a liquid crystal panel including a liquid crystal cell 131, a first polarizing plate 132 arranged on the viewer side of the liquid crystal cell 131, and a second polarizing plate 133 arranged on the back surface side of the liquid crystal cell 131. It should be noted that, although not illustrated, the image display apparatus can include any appropriate other member (such as a backlight unit) as required.

D-1. Liquid Crystal Cell

The liquid crystal cell 131 has a pair of substrates and a liquid crystal layer serving as a display medium sandwiched between the substrates. In a general configuration, a color filter and a black matrix are arranged on one of the substrates, and a switching element for controlling the electrooptical characteristics of liquid crystal, a scanning line for providing the switching element with a gate signal and a signal line for providing the element with a source signal, and a pixel electrode and a counter electrode are arranged on the other substrate. An interval between the substrates (cell gap) can be controlled with, for example, a spacer. For example, an alignment film formed of polyimide can be arranged on the side of each of the substrates to be brought into contact with the liquid crystal layer.

In one embodiment, the liquid crystal layer contains liquid crystal molecules aligned in a homogeneous array under a state in which no electric field is present. Such liquid crystal layer (resultantly the liquid crystal cell) typically shows a three-dimensional refractive index of $nx>ny=nz$. It should be noted that the expression "$ny=nz$" as used herein includes not only the case where ny and nz are completely equal to each other but also the case where ny and nz are substantially equal to each other. Typical examples of a driving mode using the liquid crystal layer showing such three-dimensional refractive index include an in-plane switching (IPS) mode and a fringe field switching (FFS) mode. It should be noted that the IPS mode includes a super in-plane switching (S-IPS) mode and an advanced super in-plane switching (AS-IPS) mode each adopting a V-shaped electrode, a zigzag electrode, or the like. In addition, the FFS mode includes an advanced fringe field switching (A-FFS) mode and an ultra fringe field switching (U-FFS) mode each adopting a V-shaped electrode, a zigzag electrode, or the like.

In another embodiment, the liquid crystal layer contains liquid crystal molecules aligned in a homeotropic array under a state in which no electric field is present. Such liquid crystal layer (resultantly the liquid crystal cell) typically shows a three-dimensional refractive index of $nz>nx=ny$. A driving mode using the liquid crystal molecules aligned in the homeotropic array under a state in which no electric field is present is, for example, a vertical alignment (VA) mode. The VA mode includes a multi-domain VA (MVA) mode.

D-2. First Polarizing Plate and Second Polarizing Plate

The first polarizing plate and the second polarizing plate each typically have a polarizer and a protective layer arranged on one side, or each of both sides, of the polarizer. The polarizer is typically an absorption-type polarizer.

The linear polarizer described in the section B can be used as the polarizer of each of the first polarizing plate and the second polarizing plate.

Any appropriate film may be used as the protective layer. As a material for the main component of such film, there are specifically given, for example: cellulose-based resins, such as triacetylcellulose (TAC); and transparent resins, such as (meth)acrylic, polyester-based, polyvinyl alcohol-based, polycarbonate-based, polyamide-based, polyimide-based, polyether sulfone-based, polysulfone-based, polystyrene-based, polynorbornene-based, polyolefin-based, or acetate-based transparent resins. In addition, examples thereof further include thermosetting resins and UV curable resins, such as acrylic, urethane-based, acrylic urethane-based, epoxy-based, or silicone-based thermosetting resins and UV curable resins. In addition, examples thereof further include glassy polymers, such as a siloxane-based polymer. In addition, a polymer film described in Japanese Patent Application Laid-open No. 2001-343529 (International Patent WO01/37007A) may also be used. For example, a resin composition containing a thermoplastic resin having in its side chain a substituted or unsubstituted imide group and a thermoplastic resin having in its side chain a substituted or unsubstituted phenyl group and a nitrile group may be used as a material for the film. An example thereof is a resin composition containing an alternating copolymer formed of isobutene and N-methylmaleimide and an acrylonitrile-styrene copolymer. The polymer film may be, for example, an extruded product of the resin composition.

The first polarizing plate and the second polarizing plate can be arranged so that the absorption axes of their respective polarizers are substantially perpendicular or parallel to each other to enable the viewing of an image.

E. Other Members

E-1. Second Linear Polarizer and Second $\lambda/4$ Plate

In one embodiment, the image display mirror for a vehicle of the present invention is configured so that light to be transmitted through the half mirror from a back surface side becomes circularly polarized light. In this embodiment, the circularly polarizing plate is arranged with the first linear polarizer on the viewer side, and is arranged so that circularly polarized light to be transmitted through the half mirror is transmitted through the circularly polarizing plate. With such configuration, when the circularly polarizing plate is brought into the attached state, the circularly polarized light transmitted through the half mirror enters the first $\lambda/4$ plate to be transformed into linearly polarized light, and the linearly polarized light is transmitted through the first linear polarizer. Accordingly, the efficiency with which light output from the image display apparatus is utilized can be improved. The configuration of this embodiment is, for example, a configuration in which a second $\lambda/4$ plate and a second linear polarizer are further arranged in the stated order from the viewer side between the half mirror and the image display apparatus. Such configuration is preferably adopted when an image display apparatus that does not output linearly polarized light (such as an organic EL display apparatus) is used. Also permitted is a configuration in which the second $\lambda/4$ plate is arranged between the half mirror and the image display apparatus, and the linear polarizer is not arranged. Such configuration is preferably adopted when an image display apparatus that outputs linearly polarized light (such as a liquid crystal display apparatus) is used.

The linear polarizer and the $\lambda/4$ plate described in the section B can be used as the second linear polarizer and the second $\lambda/4$ plate, respectively.

It is preferred that a gap between the half mirror and the second $\lambda/4$ plate be filled with a transparent resin as described in the section A, and both the members be brought into close contact with each other.

E-2. Third λ/4 Plate

In one embodiment, a third λ/4 plate is arranged on the viewer side of the circularly polarizing plate. The arrangement of the third λ/4 plate can provide an image display mirror for a vehicle excellent invisibility for a user of a pair of polarized sunglasses. It should be noted that the third λ/4 plate may be brought into contact with the circularly polarizing plate or may be out of contact therewith. In addition, the third λ/4 plate and the circularly polarizing plate may be bonded to each other through intermediation of a pressure-sensitive adhesive layer. Further, the third λ/4 plate may be arranged attachably and removably. The λ/4 plate described in the section B can be used as the third λ/4 plate. An angle formed between the absorption axis of the first linear polarizer of the circularly polarizing plate and the slow axis of the third λ/4 plate is preferably from +40° to +50° or from −40° to −50°, more preferably from +43° to +47° or from −43° to −47°, still more preferably +45° or −45°.

In one embodiment, the second λ/4 plate (or the second λ/4 plate and the second linear polarizer) and the third λ/4 plate are used in combination. That is, in this embodiment, the third λ/4 plate, the circularly polarizing plate (the first linear polarizer-the first λ/4 plate), the half mirror, the second λ/4 plate (or the second λ/4 plate-the second linear polarizer), and the image display apparatus are arranged in the stated order from the viewer side.

What is claimed is:

1. An image display mirror for a vehicle, comprising: a circularly polarizing plate arranged attachably and removably; a half mirror; and an image display apparatus in the stated order from a viewer side,
    wherein the image display mirror is configured such that attached and removed states of the circularly polarizing plate are switched, such that when an image is displayed on the image display apparatus, the circularly polarizing plate is arranged between the half mirror and a viewer, and when the image is not displayed on the image display apparatus, circularly polarizing plate is not arranged between the half mirror and the viewer.

2. The image display mirror for a vehicle according to claim 1, wherein:
    the circularly polarizing plate includes a first linear polarizer and a first λ/4 plate; and
    the first linear polarizer is arranged to be closer to the viewer side than the first λ/4 plate.

3. The image display mirror for a vehicle according to claim 1, wherein the circularly polarizing plate includes a first linear polarizer, a λ/2 plate, and a first λ/4 plate in the stated order from the viewer side.

4. The image display mirror for a vehicle according to claim 1, wherein the circularly polarizing plate is subjected to an antiglare treatment.

5. The image display mirror for a vehicle according to claim 1, wherein the circularly polarizing plate is subjected to a low-reflection treatment.

6. The image display mirror for a vehicle according to claim 1, wherein the circularly polarizing plate is subjected to an antiglare treatment and a low-reflection treatment.

7. The image display mirror for a vehicle according to claim 1, wherein the image display mirror is configured so that light to be transmitted through the half mirror from a back surface side becomes circularly polarized light.

8. The image display mirror for a vehicle according to claim 1, further comprising a λ/4 plate on a viewer side of the circularly polarizing plate.

9. The image display mirror for a vehicle according to claim 1, wherein the half mirror and the image display apparatus are brought into close contact with each other by interlayer filling.

10. A method by which a driver of a vehicle observes surroundings of the vehicle with the image display mirror for a vehicle of claim 1, the method comprising: switching attached and removed states of the circularly polarizing plate when the image is displayed on the image display apparatus and when the image is not displayed thereon; and arranging, when the image is displayed, the circularly polarizing plate between the half mirror and the driver of the vehicle.

* * * * *